June 10, 1930.                F. G. HUGHES                1,762,819
                    ANTIFRICTION BEARING AND MOUNTING
                          Filed May 6, 1925

Patented June 10, 1930

1,762,819

UNITED STATES PATENT OFFICE

FREDERICK G. HUGHES, OF BRISTOL, CONNECTICUT, ASSIGNOR TO THE NEW DE-
PARTURE MANUFACTURING COMPANY, OF BRISTOL, CONNECTICUT, A CORPORA-
TION OF CONNECTICUT ring against a flat inner member 69. A washer 70 of leather or the like is held between these two members. In Figure 5, the washers 72 and 74 are originally of a size to freely enter undercut recesses 76 and 78 in the outer race ring and a punch is then applied, as at 80, to swage or expand them into the deeper parts of the recesses.

Although the invention has been described by reference to certain specific constructions, it should be understood that, in its broader aspects, it is not necessarily limited to the forms selected for mere illustrative purposes.

I claim:

1. In a unit handling antifriction bearing, in combination, an outer race ring having a ball groove, an inner race ring having a ball groove, the grooves confronting one another radially, balls engaging said grooves and retaining the race rings in assembled relation against relative axial movement in either direction, said outer race ring having one end projecting beyond the corresponding end of the inner race ring to serve as an abutment, the outer race ring being supported solely by rolling contact with the balls; substantially as described.

2. In a unit handling antifriction bearing, in combination, an outer race ring having a ball groove, an inner race ring having a ball groove, balls engaging said grooves and retaining the race rings against relative axial movement in either direction, said outer race ring having one end projecting beyond the corresponding end of the inner race ring to serve as an abutment, and a lubricant retaining washer secured to the projecting portion of the outer race ring to handle as a unit with the latter and extending from the inner face of the outer race ring across the end of the inner race ring, said washer being spaced laterally from the end of the inner race ring to allow the outward access of lubricant to the space between the race rings; substantially as described.

3. In an antifriction bearing, in combination, an outer race ring having a ball groove, an inner race ring having a ball groove, the grooves confronting one another radially, balls engaging said grooves and retaining the race rings against relative axial movement in either direction, said outer race ring having one end projecting beyond the corresponding end of the inner race ring, a lubricant retaining washer secured to the projecting portion of the outer race ring and extending from the inner face of the outer race ring across the end of the inner race ring and spaced therefrom, and a member supporting the inner race ring and having a lubricant passage communicating with the space between the washer and the end of the inner race ring; substantially as described.

4. In an antifriction bearing, in combination, outer and inner race rings having complemental ball grooves, the grooves confronting one another radially, balls engaging the grooves and retaining the race rings against relative axial movement in either direction, one of said race rings having one end extended beyond the corresponding end of the other race ring and having its ball groove near its other end, said other end terminating short of the corresponding and axially projecting end of the other race ring, and a lubricant retaining member secured to one of said race rings and extending across the end of the other race ring; substantially as described.

5. In an antifriction bearing, in combination, outer and inner race rings having complemental ball grooves, balls engaging the grooves and retaining the race rings against relative axial movement in either direction, one of said race rings having one end extended beyond the corresponding end of the other race ring and having its ball groove near its other end, said other end terminating short of the corresponding and axially projecting end of the other race ring, a lubricant retaining member secured to one of said race rings and extending across the end of the other race ring and spaced therefrom, a member supporting one of the race rings and having a lubricant passage communicating with the space between the washer and the end of said race ring; substantially as described.

6. In an antifriction bearing, in combination, an outer race ring having a ball groove, an inner race ring having one of its ends projecting axially beyond the outer race ring to form an abutment and having a ball groove near its other end, said other end of the inner race ring terminating short of the corresponding and axially projecting end of the outer race ring which also forms an abutment, the grooves confronting one another radially, and balls engaging the grooves and retaining the race rings against relative axial movement in either direction; substantially as described.

7. In an antifriction bearing, in combination, an outer race ring having a ball race, an inner race ring having one of its ends projecting axially beyond the outer race ring to form an abutment and having a ball race near its other end, said other end of the inner race ring terminating short of the corresponding and axially projecting end of the outer race ring, balls engaging the races, and a flat lubricant retaining member secured in a recess of the axially projecting portion of the outer race ring and extending across and in spaced relation to the shorter end of the inner race ring to leave a passage between the member and the end of the ring; substantially as described.

8. In an antifriction bearing, in combination, an outer race ring having a ball groove, an inner race ring having one of its ends projecting axially beyond the outer race ring to form an abutment and having a ball groove near its other end, said other end of the inner race ring terminating short of the corresponding and axially projecting end of the outer race ring, balls engaging the grooves and retaining the race rings against relative axial movement in either direction, a lubricant retaining washer secured to the outer race ring and extending across the end of the inner race ring and spaced therefrom, a sleeve supporting the inner race ring and having a lubricant passage communicating with the space between the washer and the end of the inner race ring; substantially as described.

9. In an antifriction bearing, in combination, an outer race ring having a ball groove, an inner race ring having one of its ends projecting axially beyond the outer race ring to form an abutment and having a ball groove near its other end, said other end of the inner race ring terminating short of the corresponding end of the outer race ring, balls engaging the grooves and retaining the race rings against relative axial movement in either direction, a lubricant retaining washer secured to the outer race ring and extending across the end of the inner race ring and spaced therefrom, a slidable sleeve supporting the inner race ring and having a flange to engage the projecting end of said ring, said sleeve having a lubricant duct and an opening communicating with the space between said washer and the inner race ring, and a support for the sliding sleeve having an annular groove for connecting the duct in the sleeve with the opening in said sleeve; substantially as described.

10. In a self contained bearing and seal, in combination, an outer race ring having a raceway, an inner race ring having a raceway, said inner race having one end projecting beyond the outer race ring and its other end terminating short of the corresponding and axially projecting end of the outer race ring, rolling elements in the raceways and included between the ends of the race rings, a lubricant retaining washer secured to the outer race ring at one end and closely surrounding the projecting portion of the inner race ring, and an annular lubricant retaining member mounted on and projecting inwardly from the axially projecting end of the outer race ring, said member having its inner portion extending across the adjacent end of the inner race ring and spaced laterally therefrom to leave a passage between the member and the shorter end of the ring; substantially as described.

11. In a self contained bearing and seal, in combination, an outer race ring having a raceway, an inner race ring having a raceway, said inner race ring having one end projecting beyond the outer race ring and its other end terminating short of the corresponding and axially projecting end of the outer race ring, rolling elements in the raceways and included between the ends of the race rings, and an annular lubricant retaining member mounted on and projecting inwardly from the axially projecting end of the outer race ring, said member having its inner portion extending across the adjacent and shorter end of the inner race ring and spaced laterally therefrom to leave a radially open space between the shorter end of the ring and the member; substantially as described.

In testimony whereof I hereunto affix my signature.

FREDERICK G. HUGHES.

CERTIFICATE OF CORRECTION.

Patent No. 1,762,819.  Granted June 10, 1930, to

FREDERICK G. HUGHES.

It is hereby certified that error appears in the printed specification of the above numbered patent requiring correction as follows: Page 3, line 44, claim 10, after the word "race" insert the word "ring"; and that the said Letters Patent should be read with this correction therein that the same may conform to the record of the case in the Patent Office.

Signed and sealed this 22nd day of July, A. D. 1930.

(Seal)

Wm. A. Kinnan,
Acting Commissioner of Patents.